(12) United States Patent
Richter

(10) Patent No.: US 8,551,427 B2
(45) Date of Patent: Oct. 8, 2013

(54) TRANSPORT CONTAINER

(75) Inventor: Tobias Richter, Memmingen (DE)

(73) Assignee: Multivac Sepp Haggenmueller GmbH & Co. KG (DE)

( * ) Notice: Subject to any disclaimer, the term of this patent is extended or adjusted under 35 U.S.C. 154(b) by 435 days.

(21) Appl. No.: 12/884,829

(22) Filed: Sep. 17, 2010

(65) Prior Publication Data

US 2011/0068100 A1 Mar. 24, 2011

(30) Foreign Application Priority Data

Sep. 18, 2009 (DE) .................. 10 2009 042 094

(51) Int. Cl.
| | |
|---|---|
| *B01L 3/14* | (2006.01) |
| *A61L 2/00* | (2006.01) |
| *A61L 2/04* | (2006.01) |
| *A61L 9/00* | (2006.01) |
| *A23L 3/10* | (2006.01) |

(52) U.S. Cl.
USPC .............. 422/550; 422/297; 422/1; 426/407

(58) Field of Classification Search
USPC ................................. 422/550, 297
See application file for complete search history.

(56) References Cited

U.S. PATENT DOCUMENTS

| | | | | |
|---|---|---|---|---|
| 3,800,998 A | * | 4/1974 | Gask | 229/406 |
| 3,999,661 A | * | 12/1976 | Jones | 206/591 |
| 4,547,343 A | | 10/1985 | Takano et al. | |
| 5,226,558 A | * | 7/1993 | Whitney et al. | 220/571 |
| 5,356,040 A | * | 10/1994 | Reggiani | 222/129 |
| 5,492,243 A | | 2/1996 | Brandhorst | |
| 5,538,179 A | * | 7/1996 | Cai | 229/125 |
| 5,628,966 A | * | 5/1997 | Corby et al. | 422/555 |
| 5,693,350 A | | 12/1997 | Fernandez et al. | |
| 5,735,422 A | * | 4/1998 | Binter | 220/4.21 |
| 5,843,544 A | * | 12/1998 | Andersen et al. | 428/36.5 |
| 5,932,272 A | | 8/1999 | Raemy et al. | |
| 6,066,294 A | * | 5/2000 | Lin et al. | 422/28 |
| 6,117,460 A | | 9/2000 | Kortschack | |
| 7,303,091 B2 | | 12/2007 | Lombari | |
| 7,968,132 B2 | * | 6/2011 | Archie, Jr. | 426/109 |

(Continued)

FOREIGN PATENT DOCUMENTS

| | | |
|---|---|---|
| AT | 365150 B | 12/1981 |
| DE | 196536 | 3/1908 |

(Continued)

OTHER PUBLICATIONS

German Office Action Dated Mar. 9, 2010, Application No. 10 2009 042 094.0-27, Applicant Multivac Sepp Haggenmueller GmbH & Co. KG, 3 Pages.

(Continued)

*Primary Examiner* — Jill Warden
*Assistant Examiner* — Brittany Fisher
(74) *Attorney, Agent, or Firm* — Brooks Kushman P.C.

(57) ABSTRACT

The disclosure relates to a transport container for accommodating products during a high-pressure treatment of these products. By means of the transport container, the products can be transported into and out of a chamber in which they are high-pressure treated. The transport container comprises a lower component and an upper component which are adapted to be connected to one another, the lower component as well as the upper component being configured for accommodating at least one product.

18 Claims, 4 Drawing Sheets

(56) References Cited

U.S. PATENT DOCUMENTS

| | | | |
|---|---|---|---|
| 8,033,409 B2* | 10/2011 | Lindemann | 220/4.21 |
| 2001/0036422 A1* | 11/2001 | Lin et al. | 422/28 |
| 2003/0052017 A1* | 3/2003 | Scholz | 206/1.8 |
| 2003/0072674 A1* | 4/2003 | Melker et al. | 422/21 |
| 2005/0103801 A1* | 5/2005 | Felten et al. | 222/94 |
| 2005/0123435 A1* | 6/2005 | Cutler et al. | 422/1 |
| 2007/0193443 A1* | 8/2007 | Adolfsson | 92/157 |
| 2008/0145488 A1* | 6/2008 | Van Diepenbeek et al. | 426/106 |
| 2008/0240981 A1* | 10/2008 | Berentsveig et al. | 422/29 |
| 2008/0260916 A1 | 10/2008 | Kortschack | |
| 2010/0296967 A1* | 11/2010 | Yamamoto et al. | 422/26 |

FOREIGN PATENT DOCUMENTS

| | | | |
|---|---|---|---|
| DE | 822193 C | 11/1951 |
| DE | 7023578 | 6/1969 |
| DE | 7207545 U1 | 5/1972 |
| DE | 26 11 389 A1 | 9/1976 |
| DE | 91 09 207 U1 | 11/1992 |
| DE | 42 26 255 A1 | 2/1994 |
| DE | 37 34 025 C2 | 11/1994 |
| DE | 196 53 677 C1 | 9/1997 |
| DE | 196 49 952 A1 | 6/1998 |
| DE | 197 38 800 A1 | 3/1999 |
| DE | 198 01 031 A1 | 7/1999 |
| DE | 199 39 677 A1 | 2/2001 |
| DE | 199 52 611 A1 | 5/2001 |
| DE | 101 01 958 A1 | 7/2002 |
| DE | 10 2005 011 868 A1 | 9/2006 |
| EP | 0 165 152 A1 | 12/1985 |
| EP | 0 588 010 A1 | 3/1994 |
| EP | 0 683 986 B1 | 11/1995 |
| EP | 0 689 391 B1 | 1/1996 |
| EP | 0 748 592 B1 | 12/1996 |
| EP | 0 752 211 B1 | 1/1997 |
| EP | 1 100 340 B1 | 5/2001 |
| EP | 1 112 008 B1 | 7/2001 |
| EP | 1 201 252 B1 | 5/2002 |
| FR | 2 443 840 A1 | 7/1980 |
| FR | 2 542 200 A1 | 9/1984 |
| SU | 557003 A1 | 5/1977 |
| WO | 9524932 A1 | 9/1995 |
| WO | 0069475 A1 | 11/2000 |
| WO | 2006/097248 A1 | 9/2006 |
| WO | 2006/129180 A1 | 12/2006 |

OTHER PUBLICATIONS

Database WI Week 197811, XP-002621238, Thomson Scientific, London, GB, AN 1978-20975A.

Extended European Search Report Dated Feb. 18, 2011, Applicant MULTIVAC Sepp Haggenmuller GmbH & Co. KG, Application No. 10008292.4-2114.

German Examination Report Dated Feb. 16, 2011, Applicant MULTIVAC Sepp Haggenmuller GmbH & G Co. KG, Application No. 10 2009 042 094.0-27.

Extended European Search Report, Dated Oct. 6, 2011, Applicant Multivac Sepp Haggenmueller GmbH & Co. KG, Application No. 11006168.6-2114 / 2382878, 6 Pages.

* cited by examiner

TRANSPORT CONTAINER

CROSS-REFERENCE TO RELATED APPLICATIONS

This application claims foreign priority benefits under 35 U.S.C. §119(a)-(d) to German patent application number DE 102009042094.0, filed Sep. 18, 2009, which is hereby incorporated by reference in its entirety.

TECHNICAL FIELD

The present disclosure relates to a transport container for accommodating products during a high-pressure treatment of these products.

BACKGROUND

Foods are subjected to chemical and biological processes which change their composition and which may also produce substances that are harmful to health. Foods may, for example, oxidize or they may be modified by enzymes and microorganisms, e.g. mould fungi. These processes must be prevented or at least delayed within the desired shelf life so that foods can be eaten safely by the consumer and so that they can be transported, and will have the longest possible shelf life.

One possibility of doing this is to add large amounts of sugar or salt to the respective foods or to dry them so as to remove water therefrom, whereby the development of microorganisms, such as mould fungi or bacteria, will be impeded. Also an addition of alcohol or vinegar, an addition of preservatives as well as cooling slowdown the development of microorganisms and reduce the activity of enzymes. Furthermore, also a heat treatment can be carried out so as to kill microorganisms and deactivate harmful enzymes. During pasteurization the foodstuff is heated to a temperature below 100° C. for a certain period of time. The comparatively resistant bacterial spores remain, however, germinable during such treatment, and there is the risk that also important nutrients and flavours will be destroyed by the heat treatment.

Another method of increasing the shelf life of foods consists of filling the foods into a gas-tight package and evacuating the package before it is closed. If necessary, the package may also have added thereto a protective gas or protective gas mixtures, e.g. with nitrogen or $CO_2$. Also the expulsion of air, e.g. of oxygen, has the effect that the activity of enzymes or microorganisms is slowed down.

A method which has hitherto hardly been used, at least not on an industrial scale, is the high-pressure treatment of foods. In the case of this method, a foodstuff, which has normally already been packaged, is subjected to very high pressures of typically 400 MPa to 600 MPa for a certain period of time, e.g. for a few minutes. These high pressures have the effect that harmful microorganisms in the foodstuff will be destroyed and killed, whereas comparatively small molecules, such as vitamins, which determine the flavour and the nutritional value of the foodstuff, are hardly influenced by the high-pressure treatment. As regards meat products, the shelf life may thus be increased e.g. by a factor of 6 to 10 in comparison with the non-treated product.

In comparison with heat treatment, high-pressure treatment has various advantages. For example, there is hardly any change in flavour and the vitamin content of the foodstuff is, after a high-pressure treatment, in some cases more than twice as high as after a heat treatment. In addition, some heat-sensitive products, e.g. seafood, do not allow any heat treatment at all. Pathogenic germs, such as listeria, can be killed reliably, so that food safety will be increased. High-pressure treatments can, however, also be used for purposefully influencing the internal structure of the food, so that new product possibilities, e.g. through gelatinizing of fruit preparations without heat, are obtained. Finally, the high-pressure treatment technology has already been acknowledged in many countries as (food) safe.

When packaged food is high-pressure treated, the process conditions may lead to problems with the packaging. Optically disadvantageous modifications as well as damage may occur. Problems arise especially in the case of packages containing a protective gas atmosphere, due to the highly compressible amount of gas in the package. This is also a reason for the fact that, up to now, the packages used for high-pressure treatment have predominantly been vacuum packages.

The inactivation of microorganisms as well as the structural modification of food components are described, for example, in EP 0 588 010 A1, EP 0 689 391 B1, EP 0 752 211 B1, EP 1 100 340 B1, DE 42 26 255 A1, or DE 37 34 025 C2. EP 1 112 008 B1, EP 1 201 252 B1, DE 196 49 952 A1, DE 197 38 800 A1, DE 199 39 677 A1, and DE 26 11 389 A1 describe the effects of high-pressure treatments on microbiological storage life and the safety of food. The application of high-pressure treatment especially for meat products is described in DE 198 01 031 C2, DE 196 53 677 C1, EP 0 748 592 B1, EP 0 683 986 B1, DE 101 01 958 A1, DE 10 2005 011 868 A1, or WO 2006/097248 A1.

A plant for subjecting food to a high-pressure treatment is additionally known from WO 2006/129180 A1. In this plant an autoclave is provided, which comprises a high-pressure chamber in which the food is subjected to high pressure. For building up the pressure, the autoclave must be closed. Hence, the plant cannot be operated continuously. In order to increase the throughput of the plant, it is typically operated in a batch processing mode, in which the products are introduced in the autoclave, high-pressure treated and removed from the autoclave in groups.

In order to be able to load and unload the autoclave more rapidly and to reduce thus the cycle time, the products to be treated are normally filled into a transport container. As soon as the high-pressure chamber is free, one or possibly a plurality of transport containers can be conveyed into the high-pressure chamber, e.g. by moving them by means of a slide. After the high-pressure treatment, the transport containers are removed from the autoclave, e.g. by pushing them out on the side located opposite to the inlet opening.

The transport containers, sometimes also referred to as cartridge, normally have a circular cross-section and a cylindrical shape so as to match with the normally cylindrical inner wall of the high-pressure chamber. FIG. 5 shows a cross-section of a conventional transport container 100. The transport container 100 has an outer wall 102 that imparts a circular cross-section thereto. A filling opening 103 extends over almost the entire length of the transport container 100 on the upper side thereof. Through this filling opening 103, products 104 can be filled into the transport container 100 and removed from said transport container 100.

At least when the transport container is filled by a robot, the products 104 can only be stacked vertically directly below the filling opening 103, but not in the lateral areas covered by the outer wall 102. In order to prevent the products 104 from slipping into these areas, which are covered by the upper portions of the outer wall 102, interior walls 105 can be provided, on which the products 104 abut.

The conventional transport container is disadvantageous insofar as, at least when it is filled by a robot, a substantial part of its interior volume cannot be utilized for accommodating products therein. In addition, another part of the theoretically utilizable filling volume is not filled, since the filling level must not exceed the edge of the opening 103.

SUMMARY

It is an object of present disclosure to provide a transport container which is used for accommodating therein products during a high-pressure treatment and which, with the aid of means having the simplest possible structural design, has been improved in such a way that, although the necessary stability is guaranteed, a higher filling level will be achieved, even if the transport container is filled by a robot.

A transport container according to an embodiment of the present disclosure is characterized in that it comprises a lower component and an upper component which are adapted to be connected to one another, the lower component as well as the upper component being configured for accommodating at least one product. This multipart design of the transport container contradicts the conventional conviction that the transport container must be configured as an integral component, since it would otherwise not be able to resist the extreme pressures acting thereon during high-pressure treatment. However, surprisingly enough, it has turned out that also a multipart transport container is able to resist the high pressures, provided that it has a suitable structural design. The subdivision of the transport container into a lower component and an upper component may provide a plurality of advantages:

Both components can be filled completely, the normally non-utilizable space does not exist here.

The upper component and the lower component can be loaded or unloaded simultaneously, so that the time required for loading and unloading will be reduced.

In comparison with conventional loading, the opening available for loading and unloading is increased in size, so that loading and unloading can be executed more easily.

Due to the large cross-section of the accessible opening, individual product retaining means/interior walls can easily be inserted.

Also products of different sizes can be inserted as packing patterns in correspondence with the radius of the containers.

When the transport container is divided into an upper component and a lower component in a suitable manner, there will be no areas that are covered by the edge of the filling opening. It follows that, even if the container is filled by a robot, the whole space in the lower component and in the upper component can be filled with products in an ideal, product-specific packing pattern, so that the degree of filling and the efficiency of the high-pressure plant will be increased substantially.

It is imaginable that the lower component and the upper component are fully separated from one another during loading or unloading or at least for the purpose of maintenance and cleaning and are interconnected only during transport and high-pressure treatment. The transport container will, however, be easier to handle when the lower component and the upper component are permanently interconnected such that they are movable relative to one another, since the transport container will in this case be easier to handle as a whole and can, as a whole, e.g. be conveyed more easily from the unloading station back to the filling station.

According to one embodiment, the lower component and the upper component complement each other so as to define a cylindrical shape of the transport container in its entirety, so that the transport container will adapt itself to the shape of the interior of the high-pressure chamber in the best possible way and utilize the volume available as effectively as possible.

According to a variant of the present disclosure, the lower component and the upper component each have a semicylindrical shape. This has the effect that, on the basis of a cylindrical shape of the transport container in its entirety, the filling opening available for each of the two components will be maximized. It follows that the whole diameter of the transport container, which is cylindrical in shape in its combined condition, is available for loading and unloading.

Irrespectively of whether the lower component and the upper component are adapted to be releasably connected to one another or are permanently connected to one another, they can be connected to one another via a first hinge in the interconnected condition. This hinge allows a simple movement for closing the transport container by simply swiveling the lower component and the upper component relative to one another about the first hinge.

With respect to the high-pressure treatment, it will be advantageous when the first hinge is lubricant-free so as to prevent the lubricant from being expelled from the hinge during the high-pressure treatment. It follows that materials suitable for the hinge are e.g. so-called "self-lubricating" plastics.

At least one retaining element may be provided for retaining and securing in position products accommodated in the upper component and/or in the lower component. In the case of the transport container according to the present invention it may especially be necessary to swivel or tilt the lower component or the upper component so as to close the transport container. During such swiveling movements, the at least one retaining element will prevent the products from being displaced within the upper component or the lower component.

It is imaginable to releasably attach the at least one retaining element to the lower component and/or the upper component as well as to permanently attach the retaining element to said lower and/or upper components. Both variants may have advantages. A releasable mode of attachment may perhaps enlarge the opening available for filling in the products. A permanent mode of attachment may make it easier to uniformly handle the transport container in its entirety and it may facilitate e.g. automated handling of the same.

In particular in the case of a permanent mode of attachment, the at least one retaining element may be attached to the lower component or to the upper component via a second hinge. In this case, the retaining element could be moved by a simple swiveling movement about the second hinge so as to close the lower component and the upper component, respectively, and so as to reliably retain the products in the component in question.

The movements required for closing the transport container can be executed more easily when the swiveling axis defined by the first hinge extends parallel to the swiveling axis defined by the second hinge.

Alternatively, the at least one retaining element may be adapted to be attached to, or may be permanently attached to the lower component and/or the upper component via a rail. In this case, the retaining element would be displaceable along the rail so as to open or close the lower component and the upper component. In the case of an automated operation of the high-pressure treatment plant, this displacement may be executable more easily than a swiveling movement about a hinge.

According to one embodiment, the at least one retaining element is adapted to be releasably secured in position on the lower component and/or on the upper component, so that it is no longer able to change its position relative to the associated lower component or upper component and will thus be able to reliably retain the products.

When the retaining element is provided with at least one opening through which high-pressure medium can flow, pressure compensation between the lower component and the upper component can take place in an advantageous manner, so that the products in both parts of the transport container will be treated with the same pressure. A uniform result of the treatment will be accomplished in this way.

According to one variant of the present disclosure, the retaining element in its entirety, or at least certain areas thereof are configured as a grating. The grating is advantageous insofar as it has a comparatively low weight, comprises large openings through which the high-pressure medium can flow, and is simultaneously able to retain the products in a very reliable manner.

With respect to an automated mode of operation and with respect to the dimensioning of the high-pressure treatment plant, it proved to be advantageous when the transport container has a holding capacity in the range of 50 liters to 600 liters.

In the following, two advantageous embodiments of the invention will be explained in more detail on the basis of a drawing.

DETAILED DESCRIPTION

Figure 1:
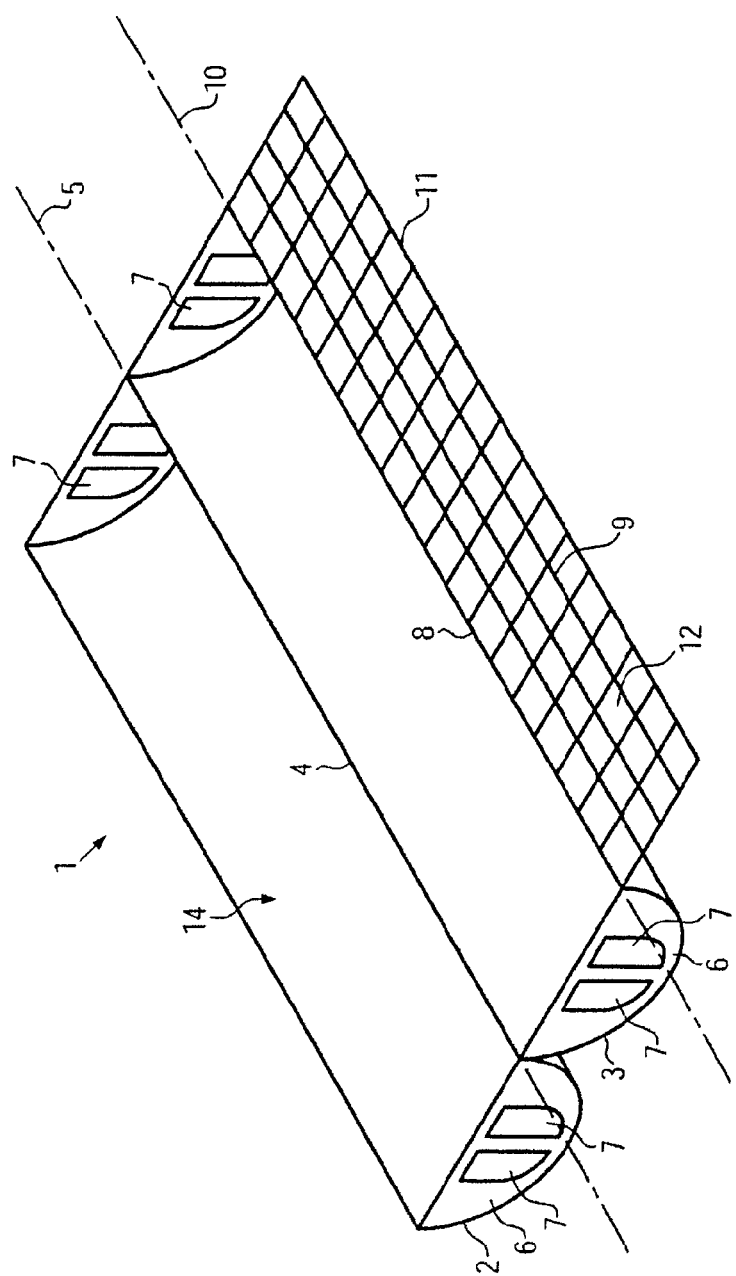
FIG. 1 shows a perspective view of a first embodiment of the transport container according to the present disclosure at an open position.

Identical components are provided with identical reference numerals in all the figures.

FIG. 1 shows a first embodiment of a transport container 1 according to the present disclosure at an open position. The transport container 1 comprises a lower component 2 and an upper component 3, each having a semicylindrical shape. The lower component 2 and the upper component 3 may consist e.g. of a high pressure-resistant plastic material. The lower component 2 and the upper component 3 are connected to one another on their longitudinal sides via a first hinge 4. The first hinge 4 defines a first swiveling axis 5 about which the upper component 3 can be swiveled relative to the lower component 2 so as to close the transport container 1.

The lower component 2 as well as the upper component 3 are provided with approximately semicircular end faces 6 at both ends thereof, when seen in the longitudinal direction. The end face 6 is flat so that a slide (not shown) can act more easily on a closed transport container 1 so as to push the transport container into and out of a high-pressure plant. Each of the flat end faces 6 has provided therein openings 7 through which high-pressure medium can enter the closed transport container 1 so that the products accommodated in the transport container 1 are subjected to high pressure. If necessary, the cylinder sides may be provided with openings 7 as well.

Via a second hinge 8, the upper component 3 has secured thereto a retaining element 9 implemented as a grating. The second hinge 8 defines a second swiveling axis 10 about which the retaining element 9 can be swiveled relative to the upper component 3. In particular, the retaining element 9 can be swiveled from the open position shown in FIG. 1 by 180° counterclockwise so that the outer edge 11 of the retaining element 9 will abut on the first hinge 4. In the area of the first hinge 4 and on the outer edge 11 of the retaining element 9, a closure member (not shown) can be provided, by means of which the retaining element 9 can be fastened releasably in the position in which it closes the upper component. The meshes 12 of the grating-shaped retaining element 9 define openings through which the high-pressure medium can flow freely between the lower component 2 and the upper component 3, so that pressure compensation is accomplished between the two components of the transport container 1.

Figure 2:
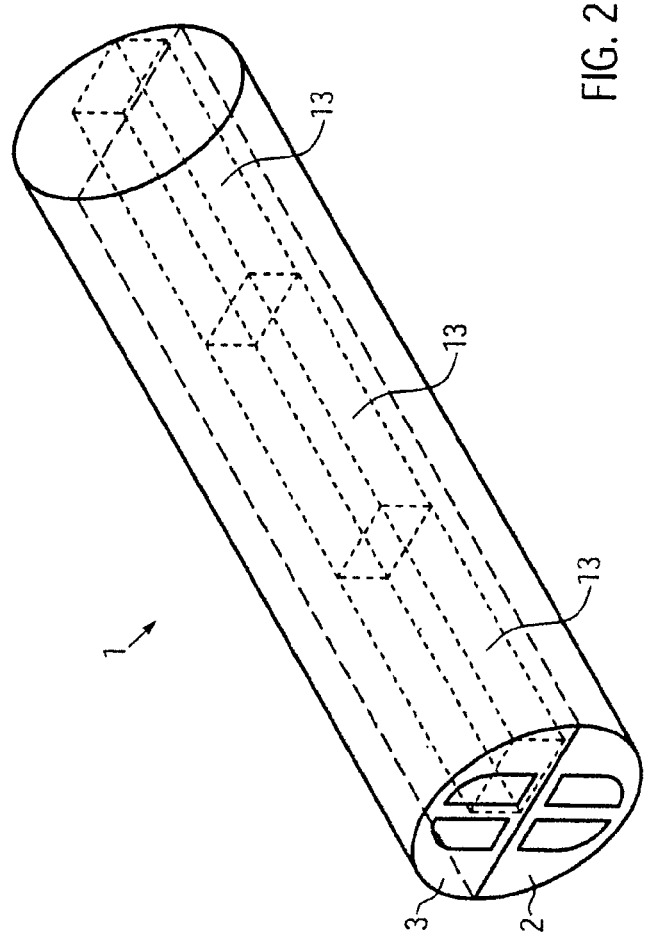
FIG. 2 shows the transport container according to FIG. 1 at a closed position.

FIG. 2 shows the transport container 1 according to FIG. 1 in a closed position. In the open condition, both the lower component 2 and the upper component 3 of the transport container 1 were first filled with products 13. FIG. 2 shows, exemplarily, three rectangular sectioned products 13, such as packaged foods, accommodated in the upper component 3. Also the other areas of the lower component 2 and of the upper component 3 have been filled with products 13—as far as the geometry of the products 13 allows such filling. Subsequently, the retaining element 9 has been swiveled about the second swiveling axis 10 and moved to a closed position where it is secured in position by the closure member (not shown). Finally, the upper component 3 has been swiveled about the swiveling axis 5 defined by the first hinge 4. The transport container 1 is thus closed and assumes the cylindrical shape shown in FIG. 2. In the closed position, the upper component 3 can be secured in position on the lower component 2 by a fastener so as to prevent the transport container 1 from being opened unintentionally.

Figure 3:
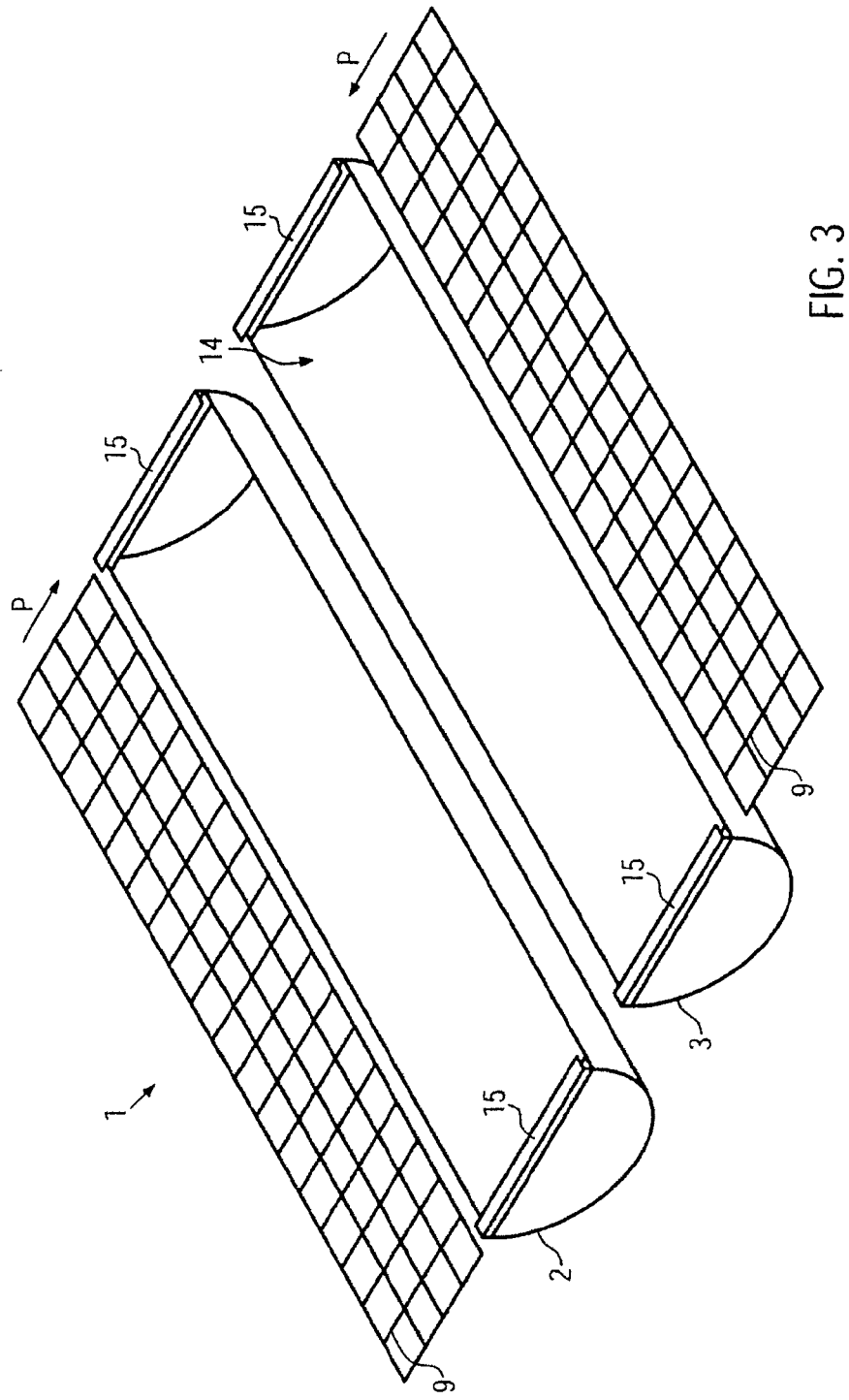
FIG. 3 shows a second embodiment of a transport container according to the present disclosure at an open position.

FIG. 3 shows a second embodiment of a transport container 1 according to the present disclosure. Also in this embodiment the transport container 1 comprises a lower component 2 and an upper component 3, each of said components being semicylindrical in shape. For the sake of clarity, the openings 7 through which the high-pressure medium flows are not shown.

A first difference in comparison with the first embodiment is that, in the second embodiment, the lower component 2 and the upper component 3 are not permanently connected to one another, but they are adapted to be releasably interconnected. In FIG. 3, they are shown in a condition in which they are separated from one another and in which the two components 2, 3 are freely accessible with their filling opening 14 facing upwards, so that products 13 can be filled into said components 2, 3 or removed therefrom. In the closed position of the transport container shown in FIG. 2, the two components 2, 3 are secured in position on one another by a fastener.

A second difference in comparison with the first embodiment is that both the lower component 2 and the upper component 3 now have a retaining element 9 of their own, said retaining element 9 being again grating-shaped. Finally, another difference is to be seen in that both the lower component 2 and the upper component 3 each have a rail 15. The respective retaining element 9 can be inserted into the rail 15 of the associated component 2, 3 of the transport container 1 in the direction of the arrow P so as to cover the filling opening 14 and secure thus the filled-in products 13 in position in the respective component 2, 3 of the transport container 1. In its closed position, the retaining element 9 can be held on the respective component 2, 3 of the transport container 1 either by a closure member or only by gravitation. When the two individual components 2, 3 of the transport container 1 have been closed, they are placed one on top of the other in such a way that the closed, cylindrical transport container 1 according to FIG. 2 is obtained.

Figures 4, 5:
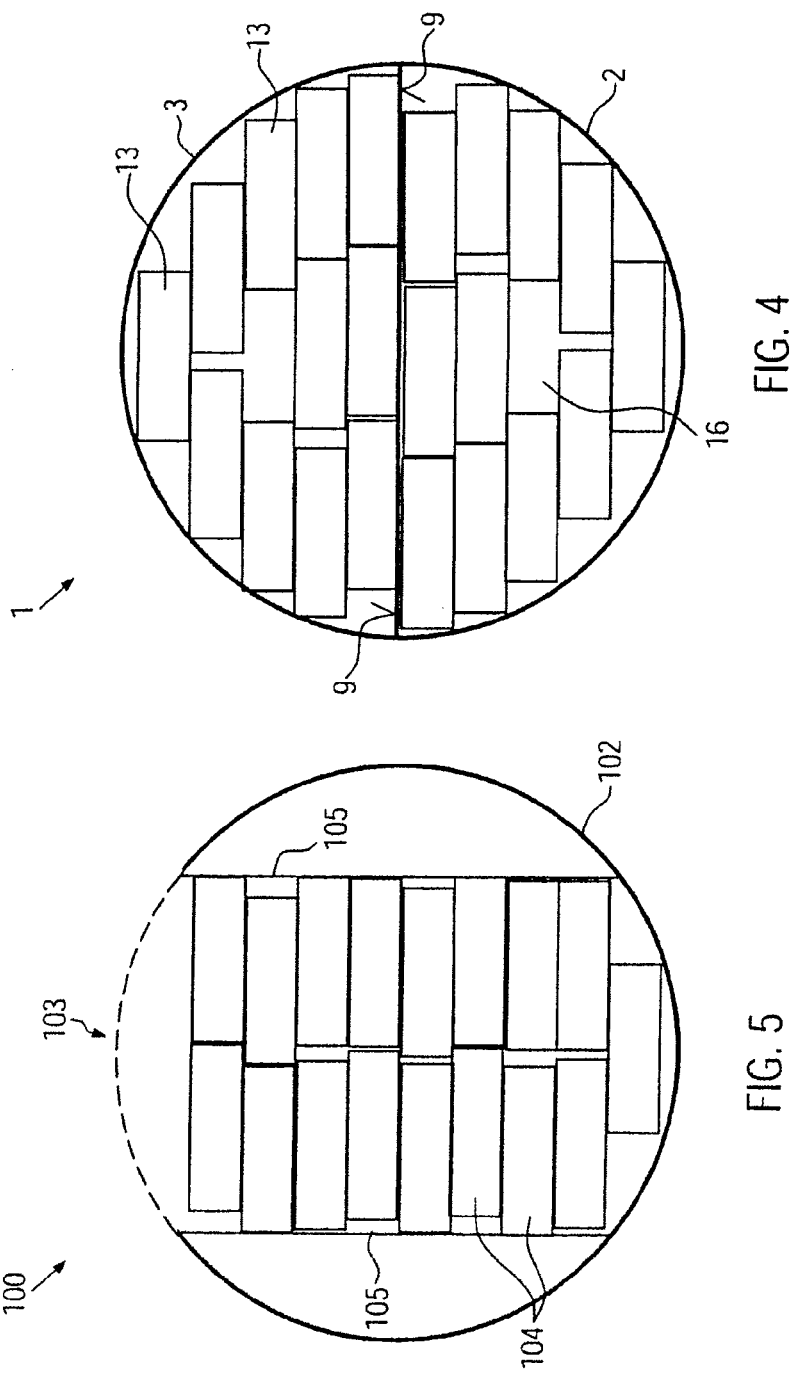
FIG. 4 shows a cross-section through a closed and filled transport container according to the present disclosure.
FIG. 5 shows a cross-section through a filled conventional transport container.

FIG. 4 shows a cross-section through the closed transport container 1 filled with products 13. Whereas the products 13 in the lower component 2 rest on the bottom of said lower component 2, the products 13 in the upper component 3 of the transport container rest on the retaining element 9. The retaining element 9 thus holds the products 13 in the upper component 3. Spaces 16 between the products allow the high-pressure medium to pass through and—in cooperation with the openings 12 in the retaining element 9—they provide pressure compensation in the transport container 1 in its entirety.

A comparison with FIG. 5 shows clearly that the transport container 1 according to the present invention achieves, in the case of automated filling, a much higher degree of filling than the conventional transport container 100. Whereas the transport container 1 according to the present invention accommodates twenty two products, the conventional transport container 100, which has the same external dimensions, is only able to accommodate seventeen products. Due to the higher degree of filling, the transport container 1 according to the present invention provides a much higher efficiency and a much higher throughput in a high-pressure treatment plant.

Starting from the above-described embodiments, the transport container 1 according to the present invention can be modified in many ways. In particular, arbitrary combinations are imaginable between lower and upper components 2, 3 which are secured to one another releasably or permanently, retaining elements 9 which are secured, releasably or permanently, to one of said lower and upper components 2, 3 or to both of them, as well as retaining elements 9 which are movably supported on the respective component 2, 3 via a hinge 8 or a rail 15. In addition, variants are imaginable in the case of which additional subdivisions or possibly removable partitions for securing the products 13 in position are provided in the lower component 2 or in the upper component 3, or in the case of which the retaining element 9 has a different structural design. For example, a net or a group of chain links may be provided as a retaining element 9, or the retaining element 9 could be largely closed and could have provided therein only a small number of openings 12 through which the high-pressure medium can flow.

Instead of a hinge 4, also other suitable systems, e.g. plug connections, may be used for interconnecting the lower component 2 and the upper component 3 of the transport container 1 permanently or releasably.

In addition, it is also possible to provide spring-biased safety elements on the lower component 2, on the upper component 3 and/or on the retaining element 9 so as to retain the products 13 more reliably in position when an only partially filled transport container 1 is being conveyed and/or during the high-pressure treatment itself. An only partially filled transport container 1 may occur e.g. during a change of batches, when the production line is run empty, or when the individual packages have a disadvantageous geometry as regards filling. The safety elements will then guarantee that the products 13 will neither shift nor tilt so that their position in the transport container 1 will not change between loading and unloading of the transport container 1. This makes automated unloading of the transport container 1 much easier. Such a safety element may e.g. be provided in the form of a board which rests on the retaining element 9 via one or a plurality of pressure springs and which thus forces the products 13 contained in the lower component 2 of the transport container downwards. The safety elements may, however, also be acted upon by a spring vertically upwards or in a lateral direction.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A transport container for accommodating products during a high-pressure treatment of the products that involves use of a high-pressure medium, the transport container comprising:
    a lower component and an upper component which are adapted to be connected to one another, the lower component as well as the upper component being configured for accommodating at least one product, wherein each of the lower and upper components has at least one opening for allowing the high-pressure medium to enter the container from outside the container during the high-pressure treatment, and
    wherein the lower component and the upper component are interconnected such that they are movable relative to one another.

2. A transport container according to claim 1 wherein the lower component and the upper component complement each other so as to define a cylindrical shape.

3. A transport container according to claim 1 wherein the lower component and the upper component each have a semi-cylindrical shape.

4. A transport container according to claim 1 wherein the lower component and the upper component are connected to one another via a first hinge.

5. A transport container according to claim 4 wherein the first hinge is lubricant-free.

6. A transport container according to claim 1 further comprising at least one retaining element for retaining products accommodated in the upper component and/or in the lower component.

7. A transport container according to claim 6 wherein the at least one retaining element is adapted to be releasably attached to the lower component and/or the upper component or is permanently attached thereto.

8. A transport container according to claim 7 wherein the lower component and the upper component are connected to one another via a first hinge, and the at least one retaining element is attached to the lower component or to the upper component via a second hinge.

9. A transport container according to claim 8 wherein each of the first and second hinges defines a swiveling axis, and the swiveling axis defined by the first hinge extends parallel to the swiveling axis defined by the second hinge.

10. A transport container according to claim 7 wherein the at least one retaining element is adapted to be attached to, or is attached to the lower component and/or the upper component via a rail.

11. A transport container according to claim 6 wherein the at least one retaining element is adapted to be releasably secured in position on the lower component and/or on the upper component.

12. A transport container according to claim 6 wherein the at least one retaining element is provided with at least one opening so that high-pressure medium can flow therethrough.

13. A transport container according to claim 6 wherein the at least one retaining element is configured as a grating, at least in certain areas thereof.

14. A transport container for accommodating packaged food products during a high-pressure treatment of the products, the transport container comprising:
- a lower component having a semicylindrical shape and being configured to receive at least one of the products;
- an upper component having a semicylindrical shape and being configured to receive at least one of the products, the upper component being connected to the lower component such that one of the components is pivotable with respect to the other component about a first axis; and
- a retaining element pivotally connected to one of the components such that the retaining element is pivotable about a second axis that is parallel to the first axis and spaced away from the first axis, the retaining element being pivotable between a first position and a second position in which the retaining element is configured to retain the respective at least one product in the one component, wherein the retaining element has a mesh configuration so that high-pressure medium can flow therethrough.

15. A transport container according to claim 1 wherein the lower component and the upper component each have a structural design configured to withstand pressure of at least 400 MPa.

16. A transport container according to claim 14 wherein at least one of the lower and upper components has at least one opening for allowing high-pressure medium to enter the container during the high-pressure treatment.

17. A transport container according to claim 14 wherein the lower component and the upper component each have a structural design configured to withstand pressure of at least 400 MPa.

18. A transport container for accommodating products during a high-pressure treatment of the products that involves use of a high-pressure medium at a pressure of at least 400 MPa, the transport container comprising:
- a first component configured to receive a first one of the products;
- a second component configured to receive a second one of the products and being closable with the first component to define an outer boundary of the container; and
- a first retaining element that is configured to be releasably attached to the first component or is permanently attached thereto, the first retaining element being movable with respect to the first component and configured to retain the first one of the products in the first component during closure of the first component with the second component, the first retaining element further having a mesh configuration so that the high-pressure medium can flow therethrough;
- wherein at least one of the first and second components has at least one opening for allowing the high-pressure medium to enter the container from outside the container during the high-pressure treatment, and wherein each of the first and second components has a structural design configured to withstand pressure of at least 400 MPa.

* * * * *